(12) United States Patent
Heeke

(10) Patent No.: US 8,235,191 B2
(45) Date of Patent: Aug. 7, 2012

(54) FORCE TRANSFER DEVICE, A DRIVE TRAIN WITH FORCE TRANSFER DEVICE, AND A METHOD FOR CONTROLLING THE OPERATION OF A FORCE TRANSFER DEVICE IN A DRIVE TRAIN

(75) Inventor: Gregory Heeke, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 1114 days.

(21) Appl. No.: 11/999,948

(22) Filed: Dec. 7, 2007

(65) Prior Publication Data

US 2008/0308375 A1 Dec. 18, 2008

Related U.S. Application Data

(60) Provisional application No. 60/934,235, filed on Jun. 12, 2007.

(51) Int. Cl.
*F16H 45/02* (2006.01)
(52) U.S. Cl. ............... 192/3.26; 192/212; 192/70.17; 192/3.29
(58) Field of Classification Search ............ 192/3.26, 192/3.25, 3.27
See application file for complete search history.

(56) References Cited

U.S. PATENT DOCUMENTS

| | | | |
|---|---|---|---|
| 5,020,646 A | 6/1991 | Koshimo | |
| 5,937,978 A * | 8/1999 | Fukushima | 192/3.29 |
| 6,648,112 B2 * | 11/2003 | Suzuki | 192/3.25 |
| 2007/0074943 A1 * | 4/2007 | Hemphill et al. | 192/3.25 |
| 2007/0251789 A1 * | 11/2007 | Heck | 192/3.21 |

* cited by examiner

*Primary Examiner* — David D Le
*Assistant Examiner* — Ryan Dodd
(74) *Attorney, Agent, or Firm* — Simpson & Simpson, PLLC

(57) ABSTRACT

A force transfer device with an input and an output, a hydrodynamic component, disposed between input and output, comprising at least one pump shell and one turbine shell and a device for bridging the power transfer through the hydrodynamic component, and a device for damping vibrations. The invention further relates to a drive train with such force transfer device and to a process for controlling the operation of a force transfer device in a drive train, comprising a first drive engine and an electrical machine, which can be operated at least as a generator. The invention is characterized in that an actuatable clutch device is disposed between the turbine shell and the output for decoupling the turbine shell from the output, and said clutch device is disposed in parallel with the lockup clutch. During braking operations through the electrical machine the lockup clutch and the turbine clutch are being deactivated.

20 Claims, 3 Drawing Sheets

FORCE TRANSFER DEVICE, A DRIVE TRAIN WITH FORCE TRANSFER DEVICE, AND A METHOD FOR CONTROLLING THE OPERATION OF A FORCE TRANSFER DEVICE IN A DRIVE TRAIN

CROSS REFERENCE TO RELATED APPLICATIONS

This application claims the benefit under 35 U.S.C. §119 (e) of U.S. Provisional Application No. 60/934,235, filed on Jun. 12, 2007, which application is incorporated herein by reference.

FIELD OF THE INVENTION

The invention relates to a force transfer device with an input and an output, a hydrodynamic component, disposed between input and output, comprising at least a primary shell and a secondary shell, and a device for bridging the power transfer through the hydrodynamic component, and a device for damping vibrations. The invention relates furthermore, to a drive train with such a force transfer device and a method for controlling the operation of a force transfer device in a drive train, comprising a first drive engine and an electric motor, which can at least be operated as a generator.

BACKGROUND OF THE INVENTION

Force transfer devices, which are disposed between a drive engine and a transmission unit, are known in a plurality of embodiments in the state of the art. They typically comprise an input and at least one output, wherein the input can be coupled at least indirectly, this means, directly or through further transfer elements, with a drive engine, typically an internal combustion engine, and at least one output, which is coupled with a transmission unit, which is disposed subsequent to the force transfer device, typically a change speed transmission. Between the input and the output, a hydrodynamic component, preferably in the form of a hydrodynamic speed-/torque converter, is disposed. It comprises at least a pump shell and a turbine shell and at least one stator shell. For bridging the hydrodynamic power transfer, a device is provided, which is also designated as a lockup clutch. It comprises a first clutch component and a second clutch component, which can be brought into operative engagement, at least indirectly. The lockup clutch is thus used for coupling between the input, or the connection between the input and the pump shell and the turbine shell. The activation or deactivation is performed through an actuation device, which is provided in the simplest case in the form of a piston element, which can be actuated through a pressure medium. Depending on the embodiment, the hydrodynamic speed-/torque converter or the entire force transfer device is provided as a two- or three-channel unit. When provided in three-channel construction, thus the actuation device for the lockup clutch is loaded with a pressure, which is separately adjustable. The hydrodynamic speed/torque converter is flowed through in a centripetal or centrifugal manner, depending on the conditions in the connections associated with the operating volume and the internal cavity enclosed by the housing and the hydrodynamic speed/torque converter. Depending on the coupling of the connections with a pressure medium supply system, a loop, which is, however, external with reference to the flow loop, established in the hydrodynamic speed/torque converter during operation, can be created. Thus, the power is transferred purely hydro-dynamically in an operating range through the power flow between the input and the output occurring through the hydrodynamic component. The primary shell, operating as pump shell, is coupled directly with the drive engine, and the turbine shell is coupled with the output or the input of the subsequent change speed transmission. In order to avoid the disadvantages of hydrodynamic power transmission in vehicle applications, which occur in the operating map of the drive engine at the required higher speed/torque settings, in order to avoid a systematic slippage of 2-3% and closing the operating map, the lockup clutch is activated and the power is transferred between the input and the output of the force transfer device, mechanically circumventing the hydrodynamic power path.

In combination with hybrid drives, in which the braking action is preferably performed electrically, and in which the braking energy is stored, when using an electric motor as a generator, a residual moment is still transferred into the transmission, or slipped into the drive engine, during braking operation, when the lockup clutch is open, when the electric motor is disposed in the transmission or in front of it, but behind the force transfer device, so that the full braking energy cannot be stored as electrical energy.

Furthermore, the drive engine can be separated from the output through opening the lockup clutch; however, torque is still transferred into the hydrodynamic component, which is transferred again into the subsequent transmission due to the coupling. On the other hand, torque peeks from the output are transferred into the hydrodynamic components. For decoupling the drive engine from the transmission, thus either an idle cutoff is provided in the transmission, this means, interruption of the force flow in the transmission at idle, or a coupling device is provided, which is used for decoupling the pump shell, and thus for decoupling the drive engine from a transmission unit, disposed subsequent to the force transfer device, as described in U.S. Pat. No. 5,020,646. The pump shell coupling is thus only required for this operating range. It is often also disposed in a range, which then leads to the enlargement of the required installation volume in radial or axial direction. Due to the possibility to separate between the pump shell and the drive engine, typically between the pump shell and the input of the force transfer device, a housing is provided, enclosing the entire unit, in particular also the pump shell. The hydrodynamic component however remains functionally associated with the transmission unit, when the pump shell is decoupled, this means, coupled with said transmission unit, which creates slip losses, in particular during separation in coasting operation. An idle cutoff in the transmission interrupts the force flow, however, the hydrodynamic component is still coupled with the drive engine, so that a moment is transmitted into the transmission, at least up to the separation location, which causes slippage losses.

SUMMARY OF THE INVENTION

Therefore, it is the object of the invention to refine a force transfer device as described above, so that the said disadvantages are being avoided, in particular, it is the object to provide an embodiment, which is as compact as possible, with the capability to optimize regenerative braking processes, when used in drive trains, in particular, hybrid drive systems with an electric motor, which can at least be operated as a generator, and with the capability to minimize idling losses. The solution according to the invention shall be characterized through a short construction and a small number of components.

A force transfer device comprises one input and at least one output, wherein the input can be coupled at least indirectly with a drive engine, and the at least one output can be coupled with an input of a subsequent transfer unit, e.g., of a subsequent transmission. The output is thus often formed directly by the transmission input shaft. A hydrodynamic component is disposed between the input and the output, comprising at least one primary shell, operating as pump shell, and a secondary shell, operating as turbine shell, forming an operating space, which can be filled, or is filled with an operating means, in which a respective flow cycle is established, when power is transferred through the hydrodynamic component. When provided as hydrodynamic speed-/torque converter, at least one stator shell is provided, which is supported at a stationary element, or at a rotating element through a freewheeling clutch. In order to bypass the hydrodynamic power transfer, a device for bypassing the power transfer through the hydrodynamic component is associated with the hydrodynamic component. This is typically provided as a lockup clutch, comprising at least a first coupling component and a second coupling component, which can be brought into operating engagement with each other. According to the invention, a clutch device is provided, which is disposed subsequent to the turbine shell in direction of the force flow, seen from the input to the output, and in parallel to the lockup clutch. This coupling device, which can also be designated as turbine shell clutch, serves the purpose of decoupling the hydrodynamic component from the output, or from the remaining drive train of a drive engine, which can be coupled with. When the lockup clutch is deactivated simultaneously, the force transmission device can be taken out of the force flow completely. Thereby, it becomes possible, that idling losses, due to slippage of elements of the hydrodynamic component and due to turning over the flow medium in the operating space are avoided. The coupling device can be actuated. Due to the possibility of selective interruption of the power transmission through actuating the coupling device, the pump shell still drives the turbine, wherein the stator shell rotates therewith, since the pump shell and the turbine shell approximately have the same speed. However, the moment is not transferred into the subsequent transmission, due to the clutch being open in this operating state. Furthermore, also in the case of a braking action, no slippage moment can be transferred into the drive engine any more.

Preferably the force transfer device is free from a so-called pump shell clutch, this means, this means of a clutch between the input and the pump shell for selective coupling or decoupling of the pump shell with the input.

Turning off the hydrodynamic component, which then does not transfer any moment, due to the lack of support, is advantageous. Depending on disposition and actuation, the clutch device can take over the function of a pure separation clutch for separating the drive engine and the transmission. The coupling possibilities and the lack of a separation location in the connection between the pump shell and the input allow the use of the pump shell as a co-rotating housing component, so that a separate housing, which encloses the entire unit, can be dispensed with.

The hydrodynamic component is preferably a hydrodynamic speed/torque converter, which is typically always full and thus the operating means can be fed, also in case of a non-occurring hydrodynamic power transfer, through an external loop from the hydrodynamic speed/torque converter and back into the operating space of the hydrodynamic speed/torque converter. Due to the constantly present charge, typically a full charge, wherein, however, also respective partially charged states are possible, the operating means is always turned over in idling operation and causes respective power losses. Through the possibility according to the invention to decouple hydrodynamic component completely from an output, subsequent to the force transfer device, due to the disposition behind the turbine wheel, during the braking action in drive trains with hybrid drives, this means, with an additional electric machine as an alternative, or additional drive unit, and its use in generator operating mode as a braking device, additional slippage losses through the drive engine can be avoided, and the entire braking power can be generated completely through the electric machine, operable as a generator, and converted into electrical energy, and stored in an energy storage device. Furthermore, moment inputs into the transmission unit, disposed subsequent to the force transfer device, can be avoided through this embodiment in idling operation.

Both clutch devices, the bridging device and the turbine shell clutch, can be actuated in series, or in parallel. Their actuation can be performed separately controllable, or force coupled for at least one operating state. Depending on the arrangement, coupling and actuation of the particular coupling devices, the force transfer device can perform different functions. The advantage is that the coupling device does not have to be actuated during traction operation, when the lockup clutch is closed. It therefore only has to be designed for the maximum torque to be transferred by the hydrodynamic component and can be sized accordingly. The required cooling power for the clutch device is lower.

During idling and braking operation, the lockup clutch and the coupling device are open, whereby turning off the hydrodynamic component and a complete separation of a drive engine, coupled with the input of the force transfer device from a transmission device, subsequent to it is possible.

According to a particularly preferred embodiment, the device for damping vibrations is disposed in parallel to the coupling device, and in series with the lockup clutch, wherein a disposition either of the lockup clutch can be performed in front, or after in force flow direction, between the input and output. This embodiment has the advantage that at least in the operating ranges, which typically coincide with the main operating range of the respective application area, and which are free from a hydrodynamic power transfer, vibration damping is assured to the desired extent, while during power transfer through the hydrodynamic component, the device for damping vibrations operates at least as an absorber.

With reference to its engineering design, the solution, according to the invention, is characterized through a high degree of functional concentration. Thus, the device for bridging the power flow in the hydrodynamic power path comprises according to its embodiment at least a first coupling component and a second coupling component, which can be brought at least indirectly, this means directly, or through additional transfer elements, into operating engagement with each other. The first clutch component and the second clutch component are preferably provided as disk elements, wherein the operating engagement is accomplished through a controllable actuation device. According to a first preferred embodiment, at least one of the coupling components, preferably the first coupling component is formed directly by the housing. According to an additional preferred embodiment, the second clutch component is additionally or alternatively formed by the actuation device, in particular by the piston element itself. Thereby, a lockup clutch is possible, which is very short in axial direction. Furthermore, the moments, which need to be transferred, can be transferred with only one pair of friction surfaces, due to the possible sizes of the available surface portions at the housing. For this purpose, mostly surfaces surface portions at the housing and at the piston element are used, which are aligned in axial direction.

Another theoretically possible functional concentration is possible between the clutch device, in particular the lockup clutch and the device for damping vibrations. The device for damping vibrations comprises a primary component, functioning as input component, and a secondary component functioning as output component, which can be rotated relative to another in circumferential direction on a limited basis, and which are disposed coaxial to another. The primary component and the secondary component are coupled with each other through torque transfer means and damping coupling means. Preferably, the torque transfer means are formed by damping coupling means. In the simplest case, these are provided in the form of spring units.

According to a particularly advantageous refinement, the actuation element, in particular the piston element of the device for bridging the hydrodynamic power path simultaneously functions as a primary component. In this case the second coupling component of the lockup clutch simultaneously is a component of the primary component of the device for damping vibrations or forms the same.

The previously mentioned combination options and functional concentrations in the particular construction elements can be used separately, but also in combination with each other.

The actuatable clutch device is disposed between the turbine shell and the output of the force transfer device, in particular of the secondary component. Thus, the connection is preferably performed, so that it is disposed spatially in axial direction in the portion of the extension of the device for damping vibrations and furthermore inside said vibration damping device in radial direction. The secondary component of the device for damping vibrations is thus formed accordingly in radial direction, so that it has a quasi pot shaped cutout in axial direction, in which the actuatable clutch device can be integrated. In order to be able to load the actuation device of the actuatable coupling device with pressure medium, a pressure cavity is associated with it. Said pressure cavity is defined by the piston element and the turbine wheel. Thereby, the first coupling components, preferably the first coupling component, which is connected with the turbine shell non-rotatably, is connected with the turbine shell through material bonding, so that a pressure—or fluid tight formation of the pressure cavity is possible.

For operating medium supply, an operating medium supply and/or conduction system is provided. It can be provided in different ways and comprises in the simplest case an operating medium supply source, which is connected with the connections which are provided in the particular pressure cavities for actuating the actuatable clutch device, the lockup clutch, and the hydrodynamic component.

The supply is preferably performed through the formation of the connection elements as hollow shafts, so that the particular conduits can be run coaxial with another in this case.

In all embodiments, respective actuation devices are associated with the lockup clutch and the clutch device. The coupling devices are provided as piston elements in the simplest case. They become effective at the elements, which can be brought into operating engagement with each other, when provided in disk or multi-disk construction. Thus, each particular actuation device can be controlled preferably separately. The controllability is assured through the provision of the force transfer device in multi-channel construction. For this purpose, at least a first connection channel is provided, which is at least indirectly coupled with the operating space, which is filled with operating medium, a second connection, which is coupled with the interior cavity between the outer circumference of the hydrodynamic component and the inner circumference of a housing, or preferably a so-called pump shell, which is connected non-rotatably with the pump wheel. The pressure in this gap loads the actuation devices of the lockup clutch and the clutch device, in particular for closing. Another chamber, which can be loaded with pressure medium, is associated with each of the actuation devices for loosening, wherein the compression force of the actuation devices is adjustable through the pressure difference between the respective chamber, which can be loaded with pressure medium, and the inner cavity. The chambers loaded with pressure medium, which are associated with the actuation devices, are thus formed by the actuation device and the wall of a connection element, in particular the output of the force transfer device, and an element of the lockup clutch, preferably the first coupling component, or the actuation device and the turbine wheel. For this purpose, the actuation device, the piston element in particular, is guided pressure and liquid tight at the connection elements. The connection elements for the chamber of the lockup clutch, which can be loaded pressure medium, typically are the output of the force transfer device, in particular an element coupled non-rotatably therewith, and another element, which can be rotated with a relative speed, compared to the output, typically the housing. This applies analogously for the coupling device. The piston element is preferably supported at the turbine wheel and at an element of the coupling device, so it is moveable in axial direction and pressure and liquid tight. The disposition of the piston elements and of the other elements of the force transfer device can be performed, so that either the operating devices are opposed, or aligned in the same direction. The gaps created thereby can be loaded with a pressure medium at will; preferably the loading is performed in a controlled manner.

The disposition of the lockup clutch, of the coupling device, and of the device for damping vibrations, is performed coaxial relative to each other, or relative to a rotation axis of the force transfer device, and in axial direction for two of the elements preferably in one plane, or slightly offset to each other, wherein the coupling device is preferably disposed on a smaller diameter, than the lockup clutch, and both clutch devices are disposed in axial direction with an offset relative to each other. The disposition of the device for damping vibrations is preferably performed between two coupling devices, wherein the clutch device for decoupling the turbine shell is preferably disposed within the axial extension of the device for damping oscillations.

BRIEF DESCRIPTION OF THE DRAWINGS

The solution according to the invention is subsequently described with reference to figures. Therein the following is shown in particular.

DETAILED DESCRIPTION OF THE INVENTION

Figure 1:
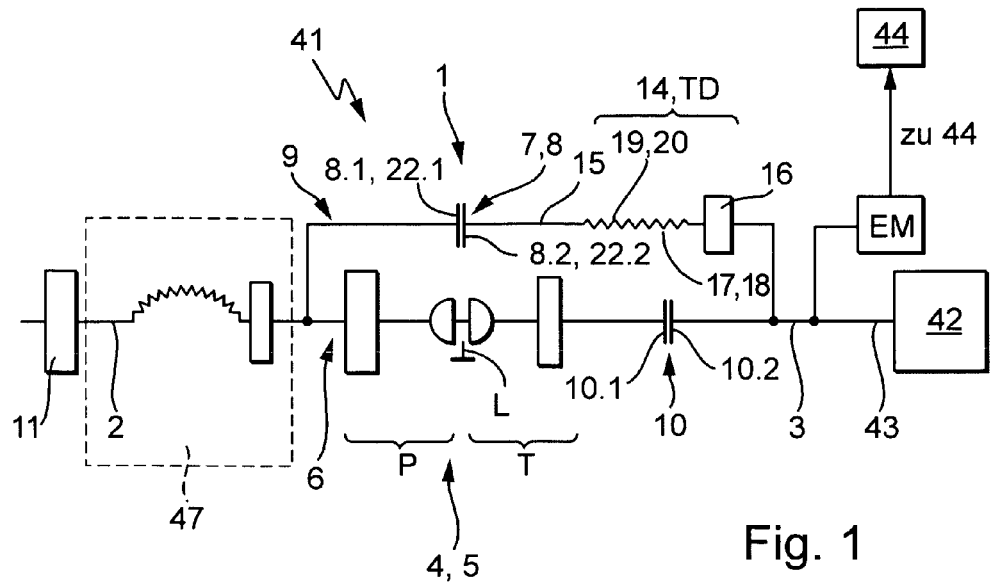
FIG. 1 illustrates the basic setup and the basic principle of a force transfer device, provided according to the invention, in a drive train with regenerative braking capability in a schematically simplified depiction.

FIG. 1 illustrates the basic construction and the basic principle of force transfer device 1, provided according to the invention, with turbine shell decoupling for application in drive trains 41, in particular drive trains of vehicles with hybrid drive in a simplified schematic. Force transfer device 1 comprises at least one input 2 and output 3. Input 2 can thus be coupled with drive engine 11, preferably in the form of a combustion engine. Output 3 is connected non-rotatably with transmission input shaft 43 of transmission 42, arranged subsequently to force transfer device 1, or it forms the transmission input shaft. Between input 2 and output 3, hydrodynamic component 4, preferably in the form of hydrodynamic speed/torque converter 5, is disposed. The hydrodynamic speed/torque converter comprises a primary shell, functioning as pump wheel P in traction operation during power transfer in vehicle applications, seen from input 2 towards the transmission input shaft, or output 3, which can be coupled with drive engine 11 non-rotatably through coupling with input 2, and an additional second shell, which can be coupled with output 3 at least indirectly, and operating as turbine shell T, and at least one stator shell L. Hydrodynamic speed/torque converter 5 thus is used simultaneously for conversion of torque and speed, and is typically filled with operating medium in all operating conditions. The power transmission through hydrodynamic component 4 is thus performed in a first operating condition through first power path 6. It is also designated as hydrodynamic power path. For circumventing the power transfer through hydrodynamic component 4 device 7 is provided for bridging hydrodynamic component 4. It is provided as so-called lockup clutch 8 and preferably as an actuatable friction locked clutch in disk construction, in particular in multi-disk construction. It is used for bridging the power flow through hydrodynamic component 4 in second power path 9. For this purpose, lockup clutch 8 is disposed between input 2 and output 3, coupling them at least indirectly.

Power transfer device 1 can be integrated into drive train 41 between drive engine 11 and transmission 42, in this case transmission input shaft 43. It is connected in front of the transmission, which is preferably provided as a change speed transmission, in particular as a manual transmission. Output 3 of force transfer device 1 can thus be connected with input 3 of transmission 42, preferably it is connected, or forms the input and thus the transmission input shaft. In order to avoid an overlay of the braking action through electric machine EM, which can then be operated as a generator through a torque imparted by drive engine 11, or a slipping of drive engine 11, and to generate the entire braking power through electric machine EM, in case of an application in a hybrid drive with electric machine EM, operable at least as a generator, which can be disposed preferably in transmission 42, or also between transmission 42 and force transfer device 1, or coupled in force transfer device 1 to drive train 41, wherein electrical machine EM can be disposed coaxial or eccentric, this means in parallel, a device for decoupling turbine shell T from drive train 41, in particular actuatable clutch device 10, is provided between hydrodynamic component 4 and transmission input shaft 43, in particular output 3, in particular between turbine shell T and output 3. The disposition is thus performed in the direction of the force flow from input 2 to output 3, seen subsequent to turbine shell T. With this layout, or embodiment of force transfer device 1, various functions can be realized, in particular depending on the actuatability of lockup clutch 8 and actuatable clutch device 10 in the form of the device for decoupling turbine shell T from drive train 41. The first function is transferring the power from input 2 to a output, which is coupled at least indirectly with output 3, either hydrodynamically through first power path 6, or through circumventing hydrodynamic component 4, in particular hydrodynamic speed/torque converter 5 through actuating lockup clutch 8 through second power path 9, or through decoupling turbine shell T from the output, in particular output 3, and thus from the additional transfer elements coupled therewith at least indirectly, and with lockup clutch 8 open, a decoupling of drive engine 11 from the transfer units arranged subsequently to force transfer unit 1, in particular transmission 42. Force transfer device 1 further comprises device 14 for damping vibrations in particular in the form of a torsion, or rotation vibration damper. The disposition can thus be performed in various ways. According to a particularly preferred embodiment, the device for damping oscillations of the lockup clutch is disposed subsequent to lockup clutch 8 with reference to the direction of the power flow, and can furthermore only be coupled with its output through actuatable clutch device 10 for turbine decoupling. Device 14 for vibration absorption is disposed in parallel to the clutch device 10, and in series to lockup clutch 8. In this case, device 14 for damping vibrations is effective only in locked up mode, this means during mechanical power transfer from drive engine 11 to output 3. During power transfer in hydrodynamic operation, device 14 for damping vibrations is only effective as an absorber.

With respect to the actual embodiment of device 14 for absorbing vibrations, there is a plurality of possibilities differing in particular with respect to the type of damping coupling used, and with respect to the coupling for torque transfer. Device 14 for damping oscillations operates in the power flow between input 2 through lockup clutch 8 to output 3 as an elastic clutch, this means it transfers torque. It comprises, seen in this power flow direction, primary component 15, designated as input component, and secondary component 16, designated as output component, wherein input component 15, and secondary component 16 are disposed coaxial with each other, and rotatable within limits in circumferential direction relative to each other. The coupling between the primary component 15 and secondary component 16 is performed through means 17 for torque transfer and means 18 for damping coupling, wherein means 17 for torque transfer and means 18 for damping coupling can also be formed by the same components. Preferably, the torque transfer is realized through energy storage units 19 in the form of spring units 20. These function simultaneously as means 18 for damping coupling. Other embodiments are conceivable, in particular when a damping effect is realized in particular through additional friction locations, or other damping concepts, e.g., hydraulic damping.

Device 47 for damping vibrations between drive engine 11 and force transfer device 1 is provided in the drive train in the embodiment according to FIG. 1 in an exemplary manner.

The basic concept described in FIG. 1 allows, on the one hand, through simultaneous, or slightly time delayed disengagement of lockup clutch 8 and of actuatable clutch device 10 for decoupling turbine shell T, to decouple drive engine 11 from transmission unit 42, disposed subsequent to force transmission device 1, or from the remaining drive train, and thus in particular in case of a hybrid drive with a regenerative brake device through electric machine EM, which can be operated at least as a generator, in this case to convert the energy imparted through drive train 41, in particular in vehicle applications during braking through the wheels, into electrical energy, and to store it in energy storage 44 in an intermediary manner, and/or to use it as drive energy for auxiliary units. Both clutch devices 8 and 10 remain deactivated during the braking process.

Figure 2:
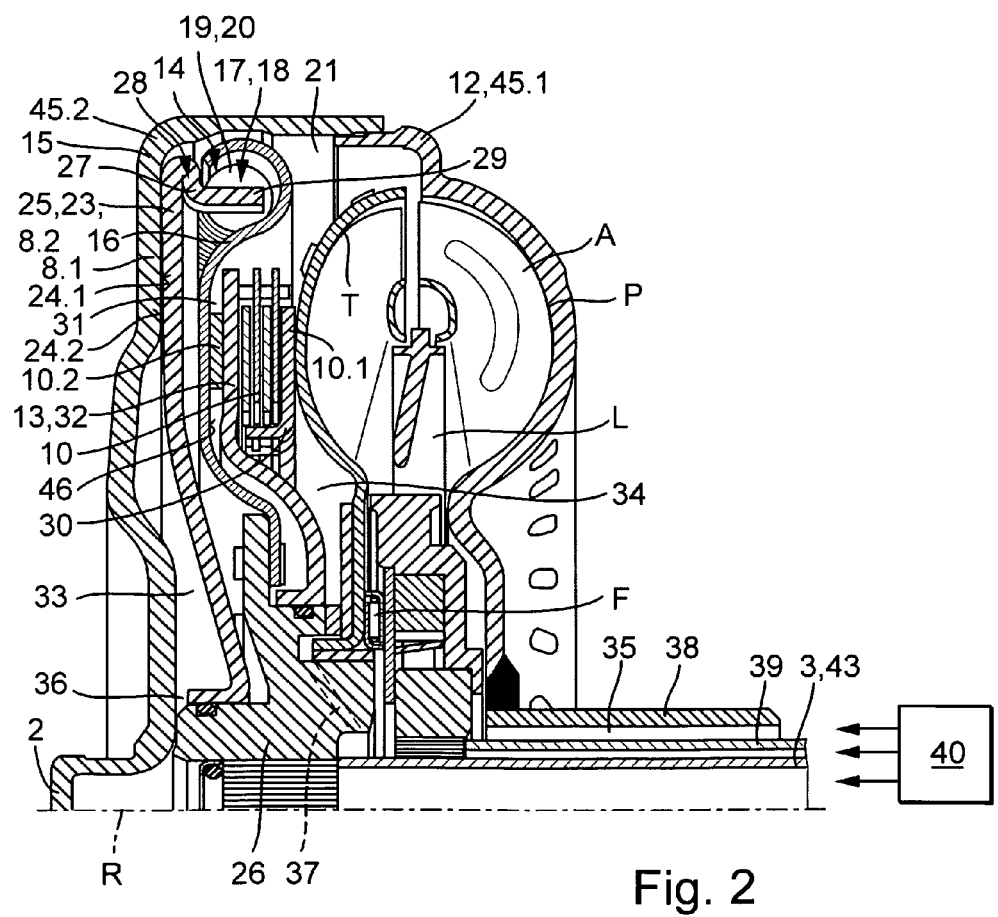
FIG. 2 illustrates a particularly advantageous embodiment of a force transfer device according to the invention in axial cross section.

FIG. 2 illustrates a particularly advantageous engineering design of a coupling structure described in FIG. 1, with reference to an axial cutout from force transfer device 1 with a series disposition of device 14 for damping vibrations and of actuatable lockup clutch 8, and a parallel disposition with actuatable clutch device 10 for the purpose of decoupling the turbine shell. This embodiment is characterized through a particularly space saving arrangement, which can be built very short in the axial direction. Thus, viewed in the direction of the force flow, lockup clutch 8, device for damping vibrations 14, actuatable clutch device 10 for turbine shell decoupling, and hydrodynamic component 4 are disposed between input 2 and output 3. Preferably, for generating a particularly compact design, lockup clutch 8 is integrated into device 14 for damping vibrations and furthermore actuatable clutch device 11 is disposed in the radial direction within the extension of device 14 for damping vibrations between it and turbine shell T. Pump shell P of hydrodynamic component 4, in particular of hydrodynamic speed/torque converter 5 has pump shell 12, which is coupled non-rotatably with pump shell P, or forms an integral unit with it, and encloses turbine shell T in the axial direction, at least partially in the circumferential direction, forming an intermediary space. Pump shell 12 is either directly coupled with input E, or forms input E. Preferably, the coupling is performed through housing component 45.2, which is provided bell shaped, and which forms housing 45 as inner cavity 21 together with pump shell 12 as another housing component 45.1, while receiving hydrodynamic speed/torque converter 5 of actuatable clutch device 10, device for damping vibrations 14 and the lockup clutch 8.

The actual design according to the embodiment illustrated in FIG. 2 is characterized through a high functional concentration. This is accomplished through using particular components and parts in multiple ways. This means they perform said functions in various units. Lockup clutch 8 is preferably provided here as a disk clutch, comprising first clutch component 8.1 in the form of disk element 22.1 and second clutch component 8.2, also in the form of disk element 22.2. Both clutch components 8.1 and 8.2, or disk elements 22.1 and 22.2, can be brought into operative engagement with each other through actuation device 23, in particular friction surface areas 24.1 and 24.2, formed at disk elements 22.1 and 22.2. Actuation device 23 is provided as piston element 25 in this case. It is provided movable in an axial direction, preferably at output 3 in the form of damper hub 26. First clutch component 8.1 of lockup clutch 8 is preferably formed by disk element 22.1, which is formed by housing component 45.2. Thus, no special devices have to be provided, carrying the friction surface bearing elements of lockup clutch 8 at the housing, or at a component, coupled with input 2, and furthermore also at a component, coupled non-rotatably with output 3, but in this case the function of lockup clutch 8 is taken over by the housing and actuation device 23. The formation of lockup clutch 8 is characterized through a small number of components. The power transfer is only performed through a friction surface contact.

Preferably, piston element 25 is simultaneously provided as second clutch component 8.2, in order to provide a particularly compact embodiment. In this case, piston element 25 functions as disk element 22.2 carrying friction surface 24.2. Furthermore, piston element 25 is preferably provided here as a component of device 14 for damping oscillations, in order to provide a series arrangement in compact construction between lockup clutch 8 and device 14 for damping vibrations. Thus, piston element 25 simultaneously forms primary component 15 of device 14 for damping vibrations. This is provided for this purpose, so that it comprises cylindrical section 27 in the illustrated embodiment, which is disposed in the portion of outer circumference 28 of piston element 25, extending in axial direction, this means in parallel to rotation axis R, forming stop surfaces 29 for means 17 for torque transfer, or means 18 for damping coupling, in this case energy storage units 19 in the form of spring units 20 in a circumferential direction, supported in an alternating manner at primary component 15 and secondary component 16. Secondary component 16 is thus connected non-rotatably with damper hub 26, which in turn is connected non-rotatably with output 3, or forms the output. The energy storage units in the form of spring units 20 are thus provided in the form of a curved spring, other embodiments are conceivable. This embodiment of device 14 for damping vibrations is characterized through a respective housing shape, which is determined in this case in particular by secondary component 16. Secondary component 16 is thus provided in the shape of an arc in the outer radial portion for receiving spring units 19, and adapted in the connection sections to the conditions with respect to installation volume and shape.

The design of actuatable clutch device 10 between turbine shell T and device 14 for damping vibrations is characterized in that, the actuatable clutch device also comprises first clutch component 10.1, coupled non-rotatably with turbine shell T, and second clutch component 10.2, connected non-rotatably with secondary component 16 of device 14 for damping vibrations, in particular through the non-rotatable coupling of secondary component 16 with damper hub 26, and thus with output 3, or transmission input shaft 43. Actuatable clutch device 10 is provided in multi-disk construction. In first clutch component 10.1 it comprises a plurality of friction liner carrying elements, which can be brought into operative engagement with the complimentary elements of second clutch component 10.2. Thus, the friction surfaces can be formed by particular disk shaped elements themselves, or they can also be generated by liners. Furthermore, actuation device 13 is associated with clutch device 10, through which coupling components 10.1 and 10.2 can be brought into operative engagement with each other. First clutch component 10.1 is connected non-rotatably with turbine shell T. For this purpose it comprises disk carrier 30, in this case, for example an inner disk carrier, carrying first disks, and second clutch component 10.2 comprises disk carrier 31, here an outer disk carrier, which is connected non-rotatably with secondary component 16 of device 14 for damping oscillations. Actuation device 13 is provided as piston element 32. The piston element is supported movably in an axial direction along the damper hub, and extends between outer and inner disk carriers 30 and 31, respectively, viewed in an axial direction. Piston 32 is furthermore movably guided at the outer disk carrier in a radial direction. For this purpose it has respective cutouts in analogy to the particular disks, which can engage into the guide. Two disk carriers 30 and 31 are provided annularly with L-shaped cross section. Disk carrier 30 is thus preferably connected with turbine shell T in a material bonded manner. This applies in analogy also for disk carrier 31 with secondary component 16. Furthermore, it is also conceivable to rivet the disk carrier. In analogy, this also applies for the connection between secondary component 16 of device 14 for damping vibrations with damper hub 26 or output 3. The connection is performed preferably non-rotatably through riveting.

Actuatable clutch device 10 extends in a radial direction between damper hub 26 and the outer partial section of device 14 for damping vibrations, in particular the area, in which spring units 20 are disposed. The extension in axial direction is provided in this case, so that device 14 for damping vibrations forms a cutout pointing in an axial direction, due to the provision of secondary component 16 as a pot shaped sheet metal part, in which cutout actuatable clutch device 10 can be received in an axial direction. The disposition of actuatable clutch device 10 is thus performed within the extension portion of device 14 for damping vibrations in axial direction.

Force transfer device 1 is provided in a multi-channel version. For this purpose the force transfer device is characterized through several pressure chambers. A first pressure chamber is defined by operating chamber A of hydrodynamic component 4. The pressure there from also propagates in inner cavity 21, this means outside of the hydrodynamic component, from the outlet between the turbine shells in radial direction along the outer circumference. The pressure in cavity 21 loads actuation devices 13, 23 of lockup clutch 8 and actuatable clutch device 10. Another cavity, which can be loaded with pressure medium, is designated with 33 herein and functions as an actuation cavity for loading actuation device 23 for lockup clutch 8, here piston element 23 for deactivating it. Another cavity 34, which can be loaded with pressure medium, is provided for loading actuation device 23 of the actuatable clutch device 10. These cavities are sealed relative to each other, depending on the functions performed by the particular elements. They each have at least one connection 35 through 37 for pressure medium supply associated with them.

The hydrodynamic speed/torque converter unit 5 is thus provided as a two-channel unit. Connection 35 is associated with operating cavity A, and the connection 36 is associated with inner cavity 21, which also simultaneously serves for pressure loading chamber 33, which can be loaded with pressure medium.

The other chamber 34, which can be loaded with pressure medium, is associated with actuatable clutch device 10. Connection 37 is connected with chamber 34. Connections 35 through 37 are thus run through the respective connection elements. In the illustrated case, pump shell P is connected non-rotatably with so-called converter hub 38. The converter hub is supported rotatably. Furthermore, the stator shell is coupled with stator shaft 39, wherein the stator shell is supported through free-wheeling clutch F at a fixed component, or at a rotating component of a subsequent power transmission unit, depending on the design of the converter. Furthermore, the coupling of damper hub 26 with the transmission input shaft is shown. The particular shafts are thus provided as hollow shafts and disposed coaxial with each other, and thereby guided within each other. Due to this guide, channels can be formed, which can be sealed relative to each other, which can be used for carrying the pressure medium. These are coupled with respective connections 35 through 37. In the simplest case, the coupling with operating space A is performed through first connection 35 through the operating means or the control means conduction system in an operating means supply and/or conduction system 40 between converter hub 38 and stator shell shaft 39. The supply of cavity 34, which can be loaded with pressure medium is preferably performed through connection 37 through the gap formed between transmission input shaft 43 and stator shell shaft 39, while the supply of connection 36 for actuating actuation device 23 of lockup clutch 8 is performed through transmission input shaft 43 towards the actuation device. In the operating means supply and/or conduction system 40 furthermore respective valve devices can be provided for control, which shall not be addressed here in detail, since their design is performed according to the judgment of a person skilled in the art.

Figure 3:
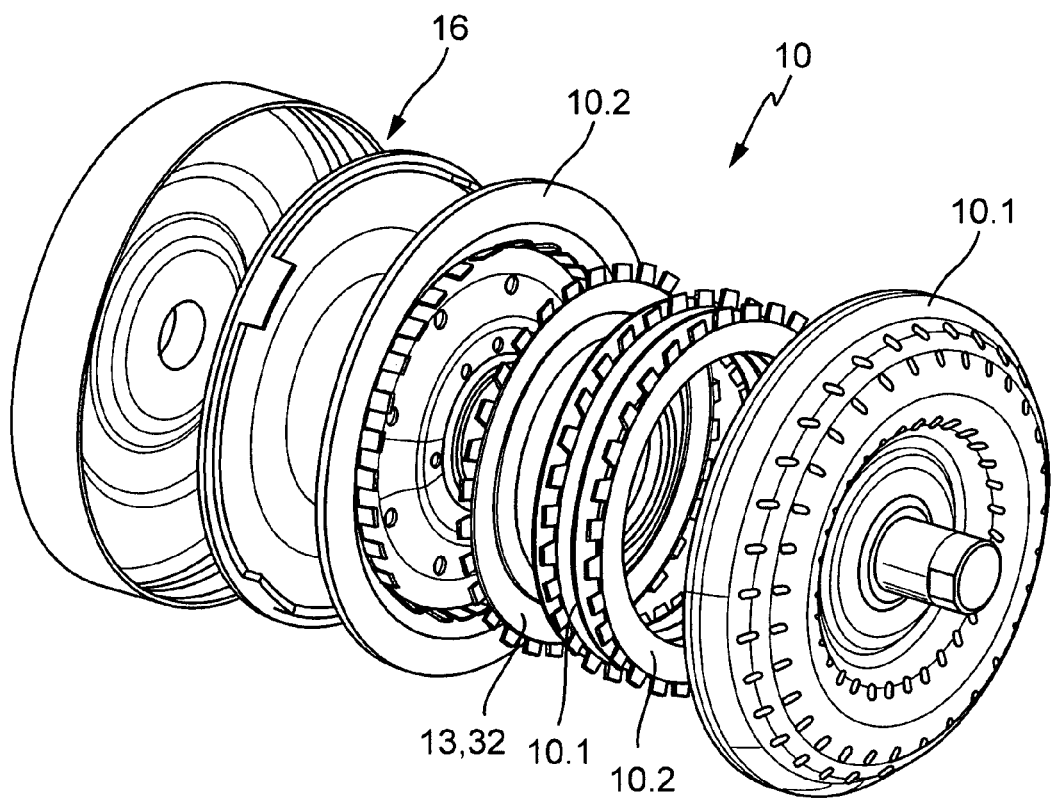
FIG. 3 illustrates the construction of a clutch device for turbine shell decoupling based on an exploded view; and, FIG. 4 illustrates the basic execution of a method according to the invention for controlling such force transfer device during braking operation in a drive train with a hybrid drive, based on a signal flow chart.

FIG. 3 illustrates the basic design of turbine clutch 10 in a schematic simplified illustration, based on an exploded view. The disk carrier, which can be coupled with turbine shell T, is visible herein, as well as the disk carrier which can be coupled with secondary component 16, and the piston element and the particular disks of the particular clutch components. These are quasi disposed within each other.

Figure 4:
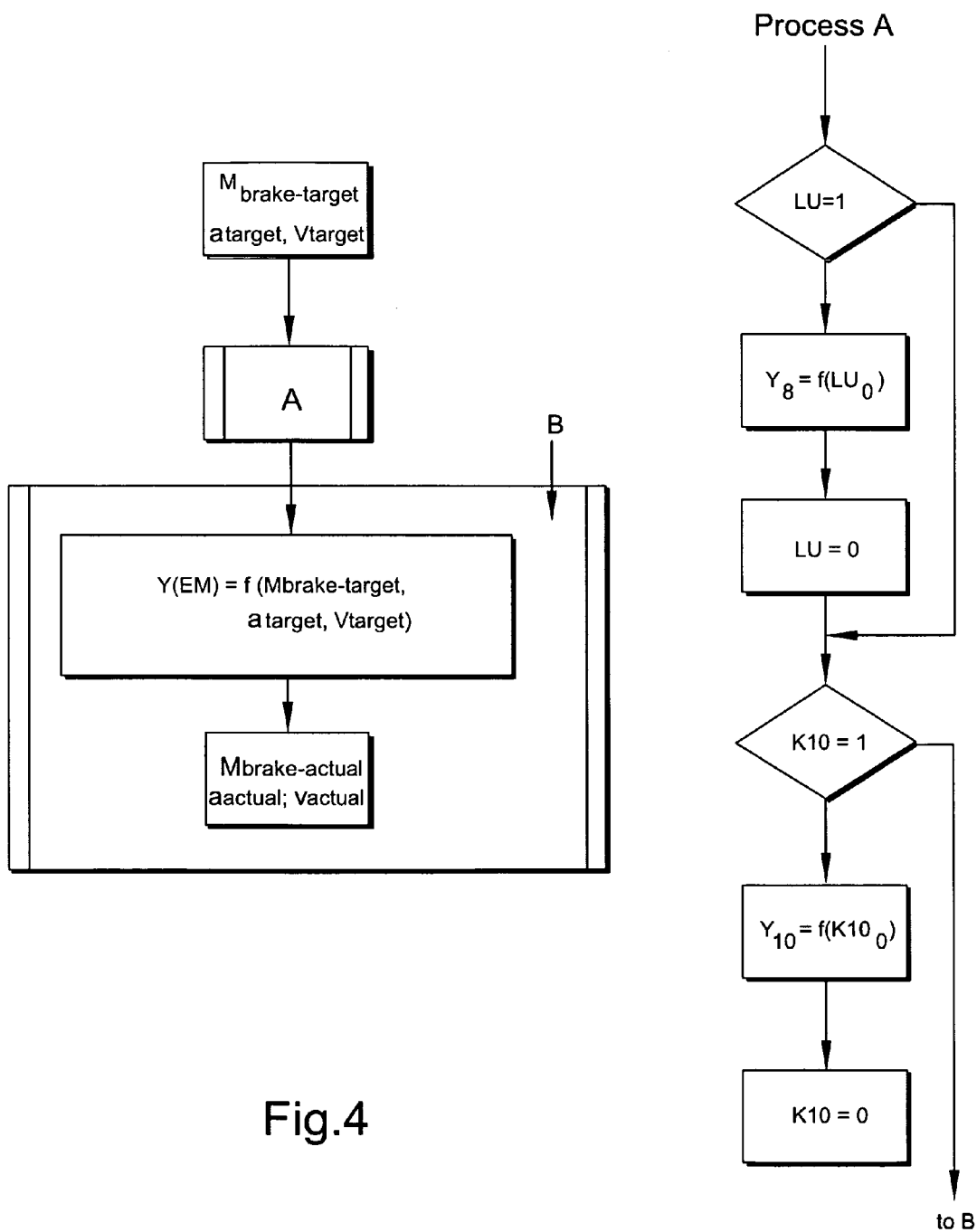

FIG. 4 illustrates a method according to the invention based on the signal flow chart for controlling a force transfer device during a braking process with drive train 41, in particular for vehicles in the form of a hybrid drive, in particular the process for decoupling drive engine 11 in a regenerative braking process for the use in hybrid drives for converting the brake energy into electrical energy through electrical machine EM, which can be operated as a generator, and feeding into energy storage unit 44. Thus, e.g., when a target value for a certain brake moment $M_{brake-target}$, a deceleration $a_{target}$ or a certain speed $v_{target}$, are provided, the actuation state of the particular clutch devices, lockup clutch 8 and actuatable clutch device 10 are checked. Initially, clutch device 8 is checked with reference to its actuation state. If it is in functional state 1, this means it is being actuated, an actuation signal $Y_8$ is put out to actuation device 23 of the lockup clutch, in order to generate the functional state 0, which corresponds to non-actuation, and thus a decoupling of output 3 or transmission input shaft 43 from drive engine 11 is generated. This applies analogously to a second process when checking the functional position of actuatable clutch device 10. Also here, 1 corresponds to the actuated state, and 0 corresponds to the non-actuated state. When operating actuatable clutch device 10, actuation signal $Y_{10}$ is put out, in order to generate functional state 0, which corresponds to non-actuation, and thus generates decoupling of output 3 or transmission input shaft 43 from drive engine 11 through the decoupling of turbine shell T. Drive engine 11 is thus decoupled completely from the subsequent transmission, so that braking can be performed regenerative without losses by controlling the electrical machine EM, which can be operated as a generator.

DESIGNATIONS 1 force transfer device
2 input
3 output
4 hydrodynamic component
5 hydrodynamic speed-/torque converter
6 first power path
7 device for bridging the hydrodynamic component
8 lockup clutch
8.1 first clutch component
8.2 second clutch component
9 second power path
10 clutch device
10.1 first clutch component
10.2 second clutch component
11 drive engine
12 pump shell
13 actuation device
14 device for damping vibrations
15 primary component
16 secondary component
17 means for torque transfer
18 means for damping coupling
19 energy storage unit
20 spring unit
21 inner cavity
22 disk element
22.1 disk element
22.2 disk element
23 actuation device 24.1 friction surface
24.2 friction surface
25 piston element
26 damper hub
27 cylindrical portion
28 outer circumference
29 stop surface
30 disk carrier
31 disk carrier
32 piston element
33 chamber loadable with pressure means
34 chamber loadable with pressure means
35 connection
36 connection
37 connection
38 converter hub
39 stator shell shaft
40 operating means conduction and supply system
41 drive train
42 transmission
43 transmission input shaft
44 energy storage unit
45.1, 45.2 housing component
45 housing
46 cutout
47 vibration damping device
R rotation axis
EM electrical machine
P pump shell
T turbine shell
L stator shell
F free-wheeling clutch
A operating space

What is claimed is:

1. A multifunctional unit for application in drive trains (41) with hybrid drive, comprising:
at least one electrical machine (EM), operable as a generator;
at least one input (2) and one output (3);
a hydrodynamic component (4) disposed between input (2) and output (3), comprising at least one pump shell (P) and one turbine shell (T);
force transfer device, comprising: (1); and
a device (7, 8) for bridging the power transfer through the hydrodynamic component (4) and
a device (14) for damping vibrations, wherein:
the force transfer device (1) comprises an actuatable clutch device (10) for decoupling the turbine shell (T) from the output (3), disposed, viewed in the direction of the force flow, between input (2) and output (3), in series with the turbine shell (T) and in parallel with the device (7, 8) for bridging the power transfer through the hydrodynamic component (4);
the device (14) for damping vibrations and the device (7, 8) for bridging the power transfer through the hydrodynamic component (4) are disposed in series;
when the actuatable clutch device is closed a first torque path is formed from the input to the output, the first torque path bypassing both the device for bridging the power transfer and the device for dampening vibrations; and
when the device for bridging the power transfer is closed a second torque path, different from the first torque path, is formed from the input to the output, the second torque path bypassing the actuatable clutch device.

2. The multifunctional unit recited in claim 1, wherein the device (14) for damping vibrations is disposed in parallel with the clutch device (10).

3. The multifunctional unit recited in claim 1, wherein the device (14) for damping vibrations of the device (7, 8) for bridging the power transfer through the hydrodynamic component (4) is disposed in the rear with reference to the direction of the force flow, viewed from the input (2) to the output (3).

4. The multifunctional unit recited in claim 1, wherein an element of the device (7, 8) for bridging the power transfer through the hydrodynamic component (4) is a component of the device (14) for damping vibrations.

5. The multifunctional unit recited in claim 1, wherein an element of the clutch device (10) is a component of the device (14) for damping vibrations.

6. The multifunctional unit recited in claim 1, wherein the device (7, 8) for bridging the power transfer through the hydrodynamic component (4) comprises a lockup clutch (8) which is provided as a friction locked clutch, comprising at least one first clutch component (8.1) and one second clutch component (8.2), which can be brought into operative engagement with each other through an actuation device (23).

7. The multifunctional unit recited in claim 6, wherein the actuation device (23) and the second clutch component (8.2) are formed by one component.

8. The multifunctional unit recited in claim 6, wherein the connection between the input (2) and the pump shell (P) is formed by a co-rotating housing (45), and the first clutch component (8.1) is formed by a partial portion of the housing (45).

9. The multifunctional unit recited in claim 1, wherein the actuatable clutch device (10) for decoupling the turbine shell (T) is provided as a friction locked clutch, comprising a first clutch component (10.1) and a second clutch component (10.2), which can be brought into operative engagement with each other through an actuation device (13).

10. The multifunctional unit recited in claim 6, wherein a single actuation device (23, 13) comprises a piston element (25, 32), which can be loaded with a pressure medium, and which is supported, pressure and liquid tight, movable in axial direction at the input (2), output (3), or the turbine shell (T), and at an element of the clutch device (10), forming a chamber (33, 34), which can be loaded through pressure or control means.

11. The multifunctional unit recited in claim 1, wherein the device (14) for damping vibrations comprises a primary component (15) and at least one secondary component (16), disposed coaxial relative to another, rotatable relative to each other in circumferential direction, and coupled with each other through torque transfer means (17) and damping coupling (18).

12. The multifunctional unit recited in claim 11, wherein the means (17) for torque transfer and/or damping coupling (18) comprises spring units (20), supported at the primary component (15) and at the secondary component (16).

13. The multifunctional unit recited in claim 11, wherein the primary component (15) of the device (14) for damping vibrations is formed by a piston element (23) of the device (7, 8) for bridging the power transfer through the hydrodynamic component (4).

14. The multifunctional unit recited in claim 11, wherein the secondary component (16) is provided as a pot-shaped shaped part, forming a cutout (46), aligned in axial direction, in whose axial extension the actuatable clutch device (10) is disposed.

15. The multifunctional unit recited in claim 9, wherein the first clutch component (10.1) of the actuatable clutch device (10) for decoupling the turbine shell (T) is connected non-rotatably with the turbine shell (T), and the second clutch component (10.2) is connected non-rotatably with the secondary component (16) of the device (14) for damping vibrations, both clutch components comprise a disk assembly with a disk carrier, wherein the disk carriers are connected non-rotatably with the connection elements, forming an axial stop, and an adjustment device (13) comprises a piston element, which is guided in the section of its outer circumference at one of the disk carriers, and defines a pressure cavity (34), which can be loaded through a pressure medium.

16. The multifunctional unit recited in claim 1, wherein the hydrodynamic component (4) is provided as a hydrodynamic speed/torque converter, in particular tri-lock converter, and comprises at least one stator shell (L), supported at a fixed or at a rotating element through a free-wheeling clutch (F).

17. The multifunctional unit recited in claim 1, wherein the hydrodynamic component (4) is provided as a hydrodynamic clutch.

18. The multifunctional unit recited in claim 1, wherein an operating means supply and conduction system (40) is associated with said force transfer device, wherein said supply and conduction system is connected through a first connection (35) with an operating cavity (A) of the hydrodynamic component (4), through a second connection (36) with the inner cavity (21) in the portion of a temporarily forming chamber (33), which can be loaded with pressure medium, and through a third connection (37) with a chamber (34), which can be loaded with the pressure means, and which is associated with the actuation device of the actuatable clutch device (10).

19. A drive train (41) for vehicle applications with a first drive engine (11), which can be coupled through the force transfer device (1) recited in claim 1 with a power transfer device (42), and with an electrical machine (EM), which can be operated at least as a generator, which is disposed after the actuatable clutch device (10).

20. A method for controlling the operation of a multifunctional unit for application in drive trains (41) with hybrid drive, the multifunctional unit including:
at least one electrical machine (EM), operable as a generator;
at least one input (2) and one output (3);
a hydrodynamic component (4) disposed between input (2) and output (3), comprising:
at least one pump shell (P) and one turbine shell (T);
a device (7, 8) for bridging the power transfer through the hydrodynamic component (4); and
a device (14) for damping vibrations, wherein:
the force transfer device (1) comprises an actuatable clutch device (10) for decoupling the turbine shell (T) from the output (3), disposed, viewed in the direction of the force flow, between input (2) and output (3), in series with the turbine shell (T) and in parallel with the device (7, 8) for bridging the power transfer through the hydrodynamic component (4); and
the device (14) for damping vibrations and the device (7, 8) for bridging the power transfer through the hydrodynamic component (4) are disposed in series; in a drive train for vehicle applications with a first drive engine (11), which can be coupled through the force transfer device (1) with a power transfer device (42), and with an electrical machine (EM), which can be operated at least as a generator, which is disposed after the actuatable clutch device (10), the method comprising:
closing the actuatable clutch device to form a first torque path from the input to the output, the first torque path bypassing both the device for bridging the power transfer and the device for dampening vibrations;
closing the device for bridging the power transfer to form a second torque path, different from the first torque path, from the input to the output, the second torque path bypassing the actuatable clutch device;
determining that a predetermined target value for a driving velocity, a deceleration, or a first brake moment has been attained;
in response to determining that the predetermined target value for a driving velocity, a deceleration, or a first brake moment has been attained, disengaging the actuatable clutch device and the device for bridging the power transfer; and,
in response to determining that the predetermined target value for a driving velocity, a deceleration, or a first brake moment has been attained, controlling the electric motor to generate a second brake moment.

* * * * *